(12) United States Patent
Pickel et al.

(10) Patent No.: US 7,120,704 B2
(45) Date of Patent: *Oct. 10, 2006

(54) METHOD AND SYSTEM FOR WORKLOAD BALANCING IN A NETWORK OF COMPUTER SYSTEMS

(75) Inventors: James Pickel, Gilroy, CA (US); Shivram Ganduri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 848 days.

This patent is subject to a terminal disclaimer.

(21) Appl. No.: 10/066,049

(22) Filed: Jan. 31, 2002

(65) Prior Publication Data

US 2003/0145113 A1  Jul. 31, 2003

(51) Int. Cl.
*G06F 15/16* (2006.01)

(52) U.S. Cl. .................. 709/248; 709/228; 709/229; 707/200; 707/201; 707/202; 707/203

(58) Field of Classification Search ................ 709/105, 709/225, 226, 248, 228, 229; 707/200–203
See application file for complete search history.

(56) References Cited

U.S. PATENT DOCUMENTS

| | | | |
|---|---|---|---|
| 5,319,773 A | 6/1994 | Britton et al. | |
| 5,561,797 A | 10/1996 | Gilles et al. | |
| 5,613,060 A | 3/1997 | Britton et al. | |
| 5,625,811 A | 4/1997 | Bhide et al. | |
| 5,774,660 A | 6/1998 | Brendel et al. | 395/200.31 |
| 5,884,327 A | 3/1999 | Cotner et al. | |
| 5,953,719 A | 9/1999 | Kleewein et al. | |
| 5,961,607 A | 10/1999 | Schaefers | |
| 6,031,978 A | 2/2000 | Cotner et al. | |
| 6,092,178 A * | 7/2000 | Jindal et al. | 712/27 |
| 6,202,079 B1 | 3/2001 | Banks | |
| 6,247,038 B1 | 6/2001 | Banks et al. | |
| 6,247,055 B1 | 6/2001 | Cotner et al. | |

(Continued)

FOREIGN PATENT DOCUMENTS

CA      2287639      10/1999

OTHER PUBLICATIONS

*Session Sharing In A Cluster of Jave Servers*, IBM Research Disclosure No. 430142, Feb. 2000, pp. 355.

(Continued)

*Primary Examiner*—Rupal Dharia
*Assistant Examiner*—Djenane M. Bayard
(74) *Attorney, Agent, or Firm*—Sawyer Law Group LLP

(57) ABSTRACT

A method and system for connecting a client to a database managed by a network of computer systems having a plurality of database management system (DBMS) members includes providing a shared network address for the plurality of DBMS members, which is used by the client to connect to an active DBMS member of the plurality of DBMS members.

Through the aspects of the present invention, the shared network address allows the client to connect, via a network router, to any one of the plurality of DBMS members so long as one member is active. Once the client is connected to one member, the member sends to the client a list of all active members and their respective workloads. The list also includes member-specific network addresses corresponding to each member so that the client can distribute work evenly across the active members and also perform a resynchronization process with a DBMS member after a first connection with the DBMS member has been interrupted.

28 Claims, 3 Drawing Sheets

U.S. PATENT DOCUMENTS

| | | | | |
|---|---|---|---|---|
| 6,324,580 | B1* | 11/2001 | Jindal et al. | 709/228 |
| 6,389,448 | B1* | 5/2002 | Primak et al. | 718/105 |
| 6,470,389 | B1* | 10/2002 | Chung et al. | 709/227 |
| 2002/0091760 | A1* | 7/2002 | Rozen | 709/203 |

OTHER PUBLICATIONS

*Managing Resource Definitions in Distributed Systems*, IBM Technical Disclosure Bulletin, vol. 38, No. 12, Dec. 1995, pp. 81-83.

Hanthiraiyan Pragaspathy, *Address Partitioning in DSM Clusters with Parallel Coherence Controllers*, IEEE Computer Society, Proceedings 2000 International Conference on Parallel Architectures and Compilation Techniques, Oct. 2000, pp. 47-56.

Vasudha Govindan, Mark A. Franklin, *Application Load Imbalance on Parallel Processors*, IEEE Computer Society Press, Proceedings of IPPS, The 10th International Parallel Processing Symposium, Apr. 1996, pp. 836-842.

Michael J. Carey, Miron Livny, Hongjun Lu, *Dynamic Task Allocation in a Distributed Database System*, IEEE Computer Society Press, Proceedings, The 5th International Conference on Distributed Computing Systems, May 1985, pp. 282-291.

Rob Goldring, *Things Every Update Replication Customer Should Know*, SIGMOD Record, vol. 24, Issue 2, Jun. 1995, Proceedings of the 1995 ACM SIGMOD, International Conference on Management of Data, pp. 439-440.

\* cited by examiner

METHOD AND SYSTEM FOR WORKLOAD BALANCING IN A NETWORK OF COMPUTER SYSTEMS

FIELD OF THE INVENTION

The present invention relates generally to a remote database managed by a set of database management system servers, and more particularly, to a method and system for enabling a client system to gain access to the remote database for workload balancing and resynchronization.

BACKGROUND OF THE INVENTION

In today's information technology industry, customers desire systems that have better performance and cost improvements over their current systems, while permitting continued use of their existing applications. High availability is also important given today's rising mobile workforce and ability for global connectivity through the Internet. Current processing system designs for information technology applications must be scalable, and provide granular growth and continuous application availability. Clustering technology, such as IBM Corporation's S/390 Parallel Sysplex, has been developed to achieve these design needs.

A cluster links individual data processing systems in a manner that creates a single, powerful system, which can support numerous users simultaneously. A cluster offers high availability and excellent scalability. If one system/node in the cluster fails, the other systems in the cluster continue to run.

Cluster technology provides many advantages in a parallel database management system. For example, FIG. 1 illustrates a sysplex environment 100 of three computers 101–103 sharing disk space such as a pool 110 of storage devices, e.g., disk drives, 111–113 where a database resides. Each computer 101–103 includes a database management system (DBMS) member 121–123 and an associated log dataset 151–153 for managing a commit or roll back of a unit of work. Each log dataset 151–153 can only be accessed by the DBMS member that owns it. Each DBMS member 121–123 knows how to communicate with other DBMS members, and each knows how to manage the pool of data 110 that is common to them. A coupling facility 120 links the computers 101–103 to one another and to the pool 110 of storage devices 111–113. The coupling facility 120 also includes a Work Load Manager (WLM) 124 that manages, monitors and balances the workload of each DBMS member 121–123.

The sysplex 100 is accessible to a plurality of client systems 140 via a network connection 145, typically a TCP/IP network. For clarity, only one client 140 is illustrated in FIG. 1. The client 140 could be another parallel sysplex or a workstation or other personal computer. The client 140 views the sysplex 100 as one image, i.e., the client 140 views the sysplex as a single remote database, and not as a plurality of discrete DBMS members 121–123. When the client 140 wishes to submit a request or command to the database, the client 140 need only initiate communication with one DBMS member, e.g. 121, of the sysplex 100. In order to gain access to the one member 121, the client 140 sends a message to a domain name server (DNS)130 asking for a network address, e.g. IP address, of a computer 101–103 in the sysplex 100 containing an active DBMS member 121–123.

The DNS 130 is tightly coupled to, i.e., integrated with, the Work Load Manager (WLM) 124, and keeps a directory of all of the different groups of computers, i.e. sysplexes, on the network, and their respective IP addresses. Each group of computers is given a domain name, such as "system1.vnet.ibm.com," and each computer in the group has a separate IP address. The client 140 registers with the DNS 130 that its databases are part of the system called "system1.vnet.ibm.com." Because the DNS 130 maintains the IP addresses, the client 140 is not required to hard code the IP addresses of the individual computers. Thus, when the client 140 submits its request to connect to a database to the DNS 130, the client 140 identifies the domain name of the database location and the DNS 130 resolves the domain name to a given group of IP addresses.

In further response to the client's 140 request, the DNS 130 checks with the WLM 124 to determine which DBMS members 121–123 are active and on which computers 101–103 they reside. The DNS 130 will then send a message back to the client 140 containing the IP address of a computer 101, 102, 103 that contains an active DBMS member for that named group. In a sysplex environment supporting workload balancing, the IP address returned by the DNS 130 to the client 140 is that of the computer having the least loaded DBMS member. In order to determine the least loaded member, the DNS 130 communicates with the WLM 124, which also monitors the workload of each DBMS member 121–123. The client 140 then utilizes that IP address to establish an initial connection with the corresponding computer containing the DBMS member in the sysplex.

Once the initial connection is made between the client 140 and the one DBMS member, e.g., 121, the DBMS member 121 returns to the client 140 a list (not shown) of active DBMS members and their respective workloads, i.e., a weighted list. The list allows the client to distribute work evenly across the active members of the database sysplex.

This configuration provides data sharing and workload balancing for a plurality of clients. However, the tight coupling of the DNS 130 to the WLM 124 presents several problems. First, DNSs have not been installed on many sysplex systems and customers are reluctant to integrate a DNS into their existing TCP/IP networks. Without the DNS 130, the client 140 cannot establish contact with the database and the distributed sysplex strategy fails. Second, even if a WLM enabled DNS is installed, a latency is associated with the exchange of information between the WLM and the DNS. Thus, if the client 140 is a gateway sending multiple requests to the DNS 130, the delay due to the latency can impair performance. Third, because the DNS is typically a UNIX based application and the WLM is a database application, integration between the WLM and the DNS is complicated and difficult.

Accordingly, a need exists for a method and system that supports workload balancing in a sysplex system and improves the performance of such a system. The method and system should be easily implemented and should not require extensive modifications of existing systems. The present invention addresses such a need.

SUMMARY OF THE INVENTION

The present invention is directed to a method and system for connecting a client to a database managed by a network of computer systems having a plurality of database management system (DBMS) members. The method and system includes providing a shared network address for the plurality of DBMS members, which is used by the client to connect to an active DBMS member of the plurality of DBMS members.

Through the aspects of the present invention, the shared network address allows the client to connect, via a network router, to any one of the plurality of DBMS members so long as one member is active. Once the client is connected to one member, the member sends to the client a list of all active members and their respective workloads. The list also includes member-specific network addresses corresponding to each member so that the client can distribute work evenly across the active members.

Through another aspect of the present invention, the member-specific network address is unique to the corresponding DBMS member and is linked with that member, and not to the computer on which it may reside. Thus, if a computer on which the DBMS member is residing goes down or if the DBMS member goes down, and the member is restarted on a different computer, the client can perform a resynchronization process, e.g., commit or roll back, by utilizing the member-specific network address to reconnect to the appropriate member.

DETAILED DESCRIPTION

The present invention relates generally to a remote database managed by a set of database management system servers, and more particularly, to a method and system for enabling a client system to gain access to the remote database for workload balancing and resynchronization. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with a preferred embodiment of the present invention, each DBMS member in the sysplex is assigned two network addresses. The first is a common network address shared by all DBMS members in the sysplex. The client utilizes the shared network address to access the sysplex via a standard router, which is capable of connecting the client to any active member located at the shared network address. The second network address assigned to each DBMS is member-specific and is attached to the member. Once the client has initiated contact with one member via the shared network address, that member provides a weighted list to the client that includes each active member's member-specific network address. The client can then distribute work evenly across the other active members. Moreover, if the connection between the client and a given member is interrupted during a commit process, the client can easily reconnect to the given member using that member's member-specific network address. Thus, work balancing and resynchronization is achieved without having to integrate a DNS with the sysplex system.

Figure 1:
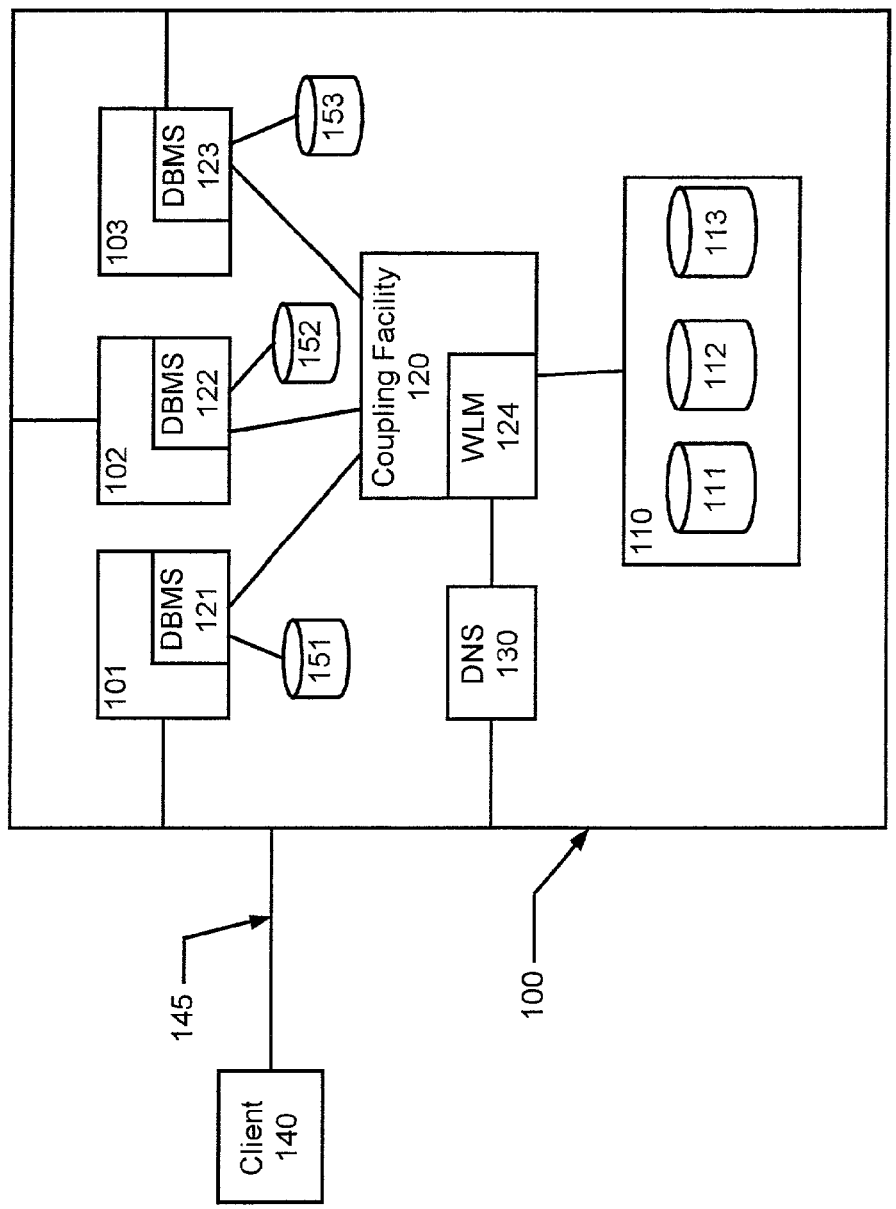
FIG. 1 illustrates a sysplex environment known in the art.
Figure 2:
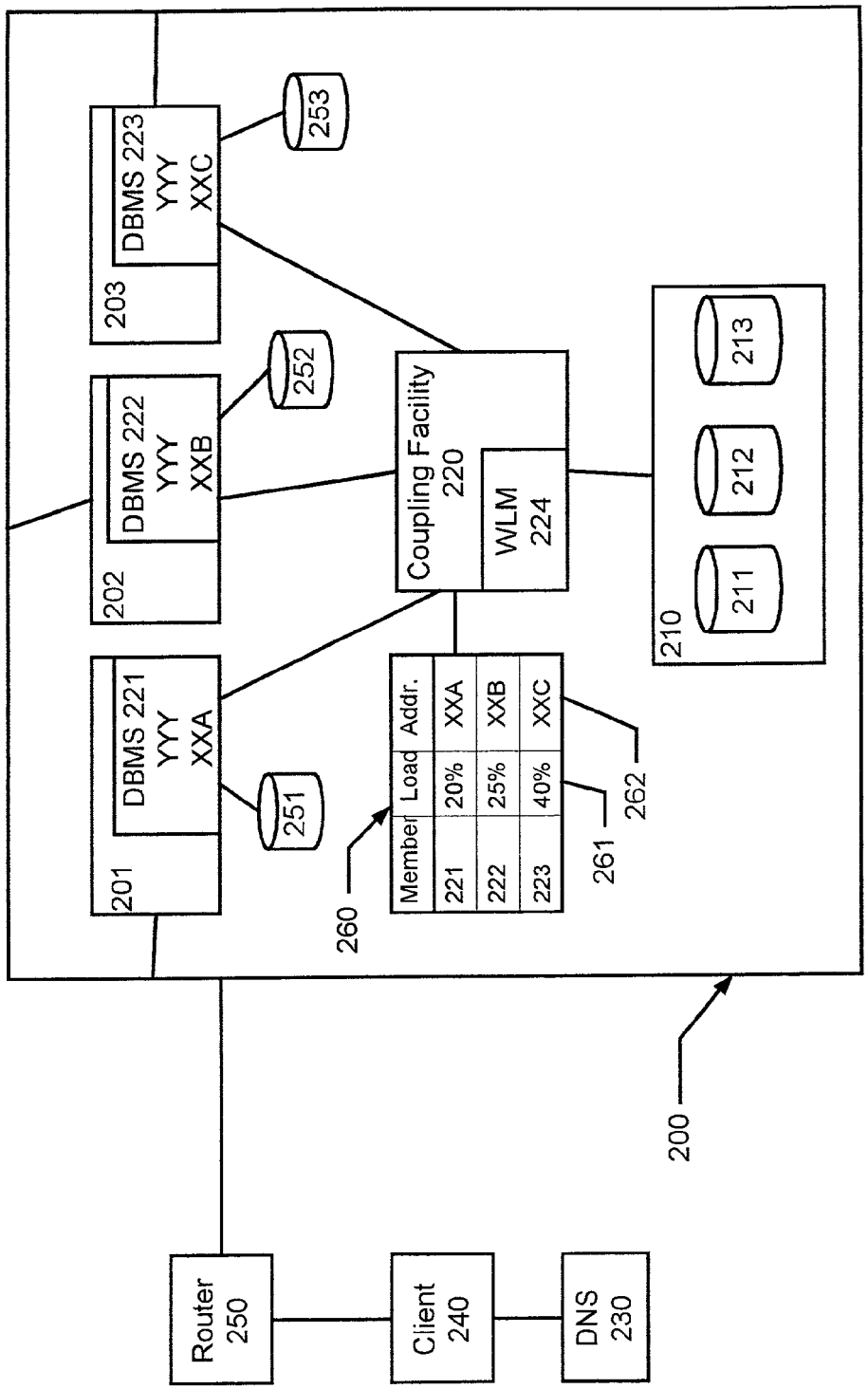
FIG. 2 illustrates a sysplex environment in accordance with a preferred embodiment of the present invention.

FIG. 2 illustrates a sysplex environment 200 in accordance with a preferred embodiment of the present invention. As is shown, the sysplex 200 includes a plurality of networked computers 201–203 coupled to a coupling facility 220, which in turn is coupled to a pool 210 of storage devices 211–213 where the database resides. While each of the computers 201–203 can include a DBMS member 221–223, such is not a requirement. In a preferred embodiment of the present invention, a client 240 is coupled to a network router 250, which in turn is coupled to the sysplex network 200. It should be recognized that, although FIG. 2 illustrates a single router 250/client 240 coupling, a plurality of routers and a plurality of clients can be coupled to the sysplex network 200.

According to a preferred embodiment, each DBMS member 221–223 is assigned two network addresses. The first network address is a shared network address (YYY), which is common to all members 221–223 of the sysplex 200. The shared network address YYY represents the entire database sharing location, and is used by the client 240 to access the database as a single image. The second network address assigned to each member 221–223 is a member-specific network address (XXA, XXB, XXC). No two members of the sysplex have the same member-specific network address. Both the shared and the member specific network addresses are linked to the corresponding DBMS member 221–223, and not to the computer 201–203 on which the member may reside. This becomes particularly relevant for resynchronization purposes.

The shared network address (YYY) is configured to access any DBMS member 221–223 of the sysplex 200. Therefore, so long as one DBMS member 221–223 is active, the network router 250 will connect the client 240 to one of the active members 221–223. In one preferred embodiment, the network router 250 is in direct communication with each DBMS member 221–223 and is aware of each member's status, i.e., active or inactive. Thus, the router 250 can route directly to one of the active members 221–223. In another embodiment, the network router 250 is coupled to a WLM 224, from which the same status information can be extracted.

A DNS 230 is coupled to the client 240, but is not integrated into the sysplex network 200. As before, the DNS 230 keeps a directory of database location domain names. In the preferred embodiment of the present invention, the DNS 230 need only store the shared network address of each remote database location. Thus, when the client 240 wishes to access a remote database using the database location domain name, the DNS 230 resolves the domain name to one network address, i.e., the shared network address, and returns that address to the client 240.

Once the client 240 has established contact with one of the active DBMS members, e.g., 221, a database protocol takes over and returns a weighted list 260 of the active DBMS members 221–223. In a preferred embodiment, the weighted list 260 includes the respective workloads 261 of each member and each member's member-specific network address 262. The client 240 can then use the weighted list 260 to distribute new connections evenly across the active members 221–223 of the database sysplex 200, thereby balancing the workload.

Figure 3:
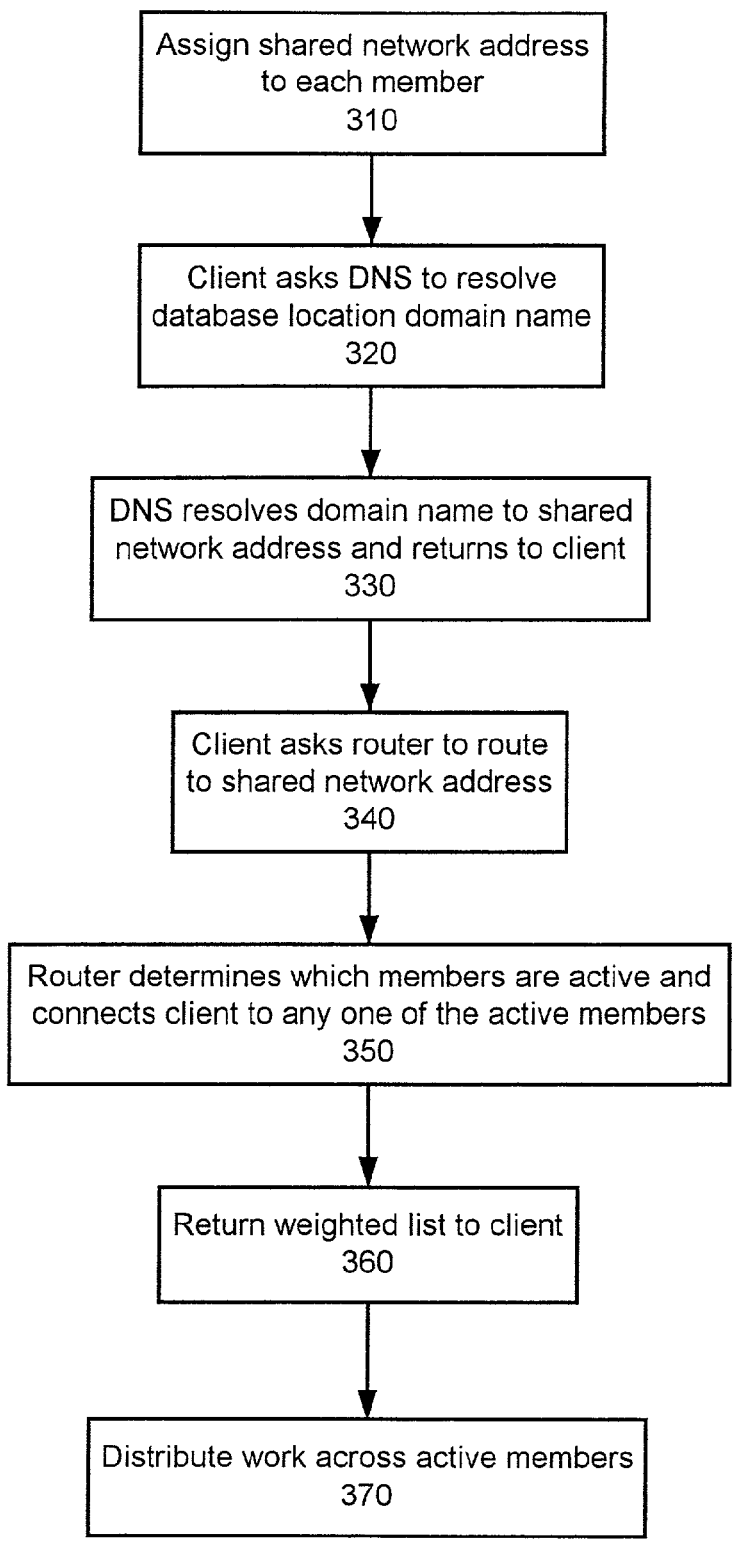
FIG. 3 is a flow chart illustrating the process of work load balancing in accordance with the present invention.

FIG. 3 illustrates a process for workload balancing in accordance with the preferred embodiment of the present invention. The process 300 begins by assigning a shared network address (YYY) to each DBMS member 221–223, via step 310. The shared network address (YYY) is the same for all members 221–223 of the sysplex 200. The client 240 asks the DNS 230 to resolve a database location domain name associated with a database residing in the sysplex 200, via step 320. The DNS 230 resolves the domain name to the shared network address (YYY), and returns it to the client 240, via step 330. In the alternative, the client 240 can maintain its own directory (not shown) that includes the shared network addresses of its databases.

In step 340, the client 240 asks the network router 250 to route to the shared network address (YYY) of the database. The router 250 determines which DBMS members 221–223, if any, are active, and connects the client 240 to any one of the active DBMS members 221–223 in step 350. Once the client 240 is connected to one DBMS member, that DBMS member will return the weighted list 260 to the client 240 in step 360, who can then distribute work evenly across the active members using the member-specific network addresses 262 in step 370.

As explained above, the client 240 can direct work to a particular DBMS member, presumably the least loaded member, e.g. member 221, by routing the request or command to the member's member-specific network address (XXA). The member-specific network address also provides another advantage when communication between the client 240 and a member 221 has been interrupted during a two-phase commit procedure and the member 221 has been restarted on a different computer, e.g. computer 202 or 203.

As stated above, each DBMS member 221–223 "owns" a log dataset 251–253 that records every unit of work processed by the owning DBMS member. Only the DBMS member can access its log dataset, i.e. the information in the log dataset is not shared between the members. When a communication failure occurs during the two-phase commit process, the client 240 must "resychronize" with the member of the sysplex, e.g., 221, that owns the log records 251 associated with the client's 240 unit of work. The resynchronization process allows the client 240 to determine the outcome (success or failure) of the unit of work at the DBMS member 221. In order to perform resynchronization, however, the client 240 must re-establish communications with the member 221 that performed the original unit of work.

According to the method and system of the present invention, the member-specific network address (XXA) is linked to its corresponding member, and not to the computer on which that member 221 may be running. The client 240 need only use the member-specific network address (XXA) to reconnect to the member 221, regardless of where it may have been restarted. Thus, where it was once difficult to track down the network address of a particular member that had been restarted on a different computer, e.g., due to a computer failure, such a task is now simple under the method and system of the present invention.

Through aspects of the method and system of the present invention, workload balancing and commit resynchronization in a sysplex network can be performed without requiring a DNS to be tightly coupled to the sysplex. Problems associated with integrating a UNIX based application with a database application are avoided. By replacing the DNS with a network router, the latency associated with the DNS is eliminated and the time required to establish an initial connection between the client and the sysplex is reduced, thereby improving performance. Moreover, no modifications to the client are necessary to implement the method and system of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

For example, although the present invention has been described with reference to a sysplex environment, the invention could be applicable to other systems having multiple servers which as those within a single system, e.g., one having multiple processors with shared memory, or a network of systems. Also, although this invention has been described with reference to a DBMS server such as a relational database management system product such as IBM DB2, the invention is applicable to any type of server, e.g., file servers, print servers, file transfer programs, etc.

What is claimed is:

1. A method for connecting a client to a database managed by a network of computer systems, the network of computer systems including a plurality of database management system (DBMS) members, the method comprising the steps of:
   (a) providing a shared network address for the plurality of DBMS members;
   (b) utilizing the shared network address by the client to connect to an active DBMS member of the plurality of DBMS members;
   (c) assigning each DBMS member in the plurality of DBMS members a corresponding member-specific network address, wherein the member-specific network address is associated with the corresponding member regardless of its location; and
   (d) utilizing the member-specific network address of a DBMS member to re-establish a connection to the DBMS member for performing a resynchronization process after a first connection to the DBMS member has been interrupted.

2. The method of claim 1, wherein the shared network address is common to each DBMS member of the plurality of DBMS members.

3. The method of claim 1, wherein the utilizing step (b) further includes the steps of:
   (b1) submitting a domain name for the database location to a domain name server coupled to the client;
   (b2) resolving the domain name to the shared network address; and
   (b3) returning the shared network address to the client from the domain name server.

4. The method of claim 1, wherein the utilizing step (b) further includes the step of:
   (b1) sending the shared network address by the client to a network router coupled to the network of computer systems.

5. The method of claim 1, wherein the utilizing step (b) further includes the step of:
   (b1) determining which ones of the plurality of DBMS members located at the shared network address are active.

6. The method of claim 5, wherein the determining step (b1) further includes:
   (b1i) communicating with a work load manager coupled to the plurality of DBMS members, wherein the work load manager monitors the status and workload of each active DBMS member.

7. The method of claim 5, wherein the utilizing step (b) further includes the step of:
   (b2) connecting the client to any one of the active DBMS members located at the shared network address.

8. The method of claim 5, further comprising the step of:
(c) transmitting to the client a list of active DBMS members from an active DBMS member.

9. The method of claim 5, further comprising the steps of:
(e) providing a weighted load for each active DBMS member; and
(f) identifying a member-specific network address associated with each active DBMS member.

10. The method of claim 9, further comprising the step of:
(g) balancing a workload across the active DBMS members based on their respective weighted loads.

11. A computer readable medium containing programming instructions for connecting a client to a database managed by a network of computer systems, the network of computer systems including a plurality of database management system (DBMS) members, comprising programming instruction for:
(a) providing a shared network address for the plurality of DBMS members;
(b) utilizing the shared network address by the client to connect to an active DBMS member of the plurality of DBMS members;
(c) assigning each DBMS member in the plurality of DBMS members a corresponding member-specific network address, wherein the member-specific network address is associated with the corresponding member regardless of its location; and
(d) utilizing the member-specific network address of a DBMS member to re-establish a connection to the DBMS member for performing a resynchronization process after a first connection to the DBMS member has been interrupted.

12. The computer readable medium of claim 11, wherein the shared network address is common to each DBMS member of the plurality of DBMS members.

13. The computer readable medium of claim 11, wherein the utilizing instruction (b) further includes the instructions for:
(b1) submitting a domain name for the database location to a domain name server coupled to the client;
(b2) resolving the domain name to the shared network address; and
(b3) returning the shared network address to the client from the domain name server.

14. The computer readable medium of claim 11, wherein the utilizing instruction (b) further includes the instruction for:
(b1) sending the shared network address by the client to a network router coupled to the network of computer systems.

15. The computer readable medium of claim 11, wherein the utilizing instruction (b) further includes the instruction for:
(b1) determining which ones of the plurality of DBMS members located at the shared network address are active.

16. The computer readable medium of claim 15, wherein the determining instruction (b1) further includes:
(b1i) communicating with a work load manager coupled to the plurality of DBMS members, wherein the work load manager monitors the status and workload of each active DBMS member.

17. The computer readable medium of claim 15, wherein the utilizing instruction (b) further includes the instructions for:
(b2) connecting the client to any one of the active DBMS members located at the shared network address.

18. The computer readable medium of claim 15, further comprising the instruction for:
(e) transmitting to the client a list of active DBMS members from an active DBMS member.

19. The computer readable medium of claim 15, further comprising the instructions for:
(e) providing a weighted load for each active DBMS member; and
(f) identifying the member-specific network address associated with each active DBMS member.

20. The computer readable medium of claim 19, further comprising the instruction for:
(g) balancing a workload across the active DBMS members based on their respective weighted loads.

21. A system for connecting a client to a database managed by a network of computer systems, the network of computer systems including a plurality of database management system (DBMS) members, the system comprising:
a shared network address for the plurality of DBMS members; and
a network router coupled to the client for utilizing the shared network address to connect the client to an active DBMS member of the plurality of DBMS members; and
means for assigning a corresponding member-specific network address for each DBMS member, wherein the member-specific network address is associated with the corresponding member regardless of its location,
wherein the client utilizes the member-specific network address to perform a resynchronization process with a DBMS member after a first connection with the DBMS member has been interrupted.

22. The system of claim 21, wherein the shared network address is common to each DBMS member of the plurality of DBMS members.

23. The system of claim 21, further comprising:
a domain name server coupled to the client, wherein the client submits a domain name for the network of computer systems to the domain name server and the domain name server resolves the domain name to the shared network address and returns the shared network address to the client.

24. The system of claim 21, wherein the network router comprises means for determining which ones of the plurality of DBMS members located at the shared network address are active.

25. The system of claim 24, wherein the determining means includes a work load manager coupled to the plurality of DBMS members, wherein the work load manager monitors the status and workload of each active DBMS member and communicates the status to the network router.

26. The system of claim 24, wherein each active DBMS member further includes means for transmitting a list of active DBMS members to the client.

27. The system of claim 24, further comprising:
means for providing a weighted load for each active DBMS member; and
means for identifying a member-specific network address associated with each active DBMS member.

28. The system of claim 27, further comprising:
means for distributing work evenly across the active DBMS members based on their respective weighed loads.

* * * * *